July 16, 1957 E. GANITTA 2,799,725
ARRANGEMENT FOR COUPLING MONITORING DEVICES TO TWO-WIRE COMMUNICATIONS TRANSMISSION LINES
Filed Sept. 8, 1955
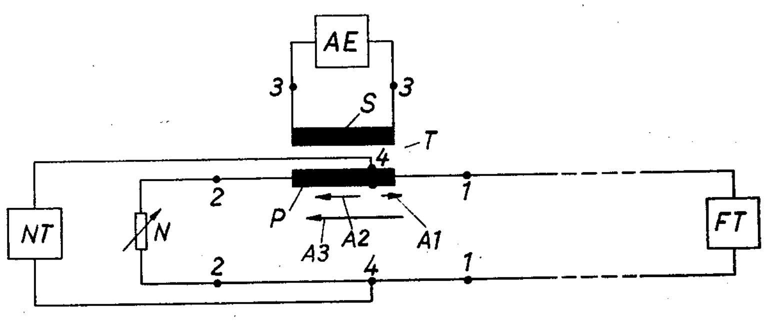
INVENTOR
E. GANITTA
BY Robert Harding Jr.
ATTORNEY United States Patent Office 2,799,725

Patented July 16, 1957

2,799,725

ARRANGEMENT FOR COUPLING MONITORING DEVICES TO TWO-WIRE COMMUNICATIONS TRANSMISSION LINES

Eugen Ganitta, Stuttgart, Germany, assignor to International Standard Electric Corporation, New York, N. Y., a corporation of Delaware Application September 8, 1955, Serial No. 533,176

Claims priority, application Germany September 14, 1954

2 Claims. (Cl. 179—1)

The invention relates to an arrangement for coupling monitoring devices to two-wire telephone lines. Usually monitoring devices are interposed at one end of such a connection in order that the call may be monitored by an operator or, recorded by a suitable sound recorder. The speech voltages from the subscriber's station nearest to the monitoring point are therefore high, whereas those from the remote subscriber's station will in general be strongly decreased by the line attenuation. In the most extreme case, differences of loudness up to 4 nepers can arise and considerably impair the intelligibility of speech. In the conventional junctional appliances of this kind, those employing condensers or repeaters, differentials in audio levels can not be avoided without the aid of complicated arrangements. Furthermore, it is desirable monitoring devices should not add perceptibly to the attenuation inherent in the connection.

The invention avoids the troublesome drawback of great differentials in audio level while satisfying in a simple manner the aforesaid requirements as to attenuation. To that end my invention provides a circuit wherein a two-wire line includes an impedance having an unbalanced fork connection so included in it that the near subscriber's station is situated in the fork diagonal, and, the monitoring device is coupled to the fork output. The fork input comprising the lesser number of turns has the remote subscriber's station connected to it while to the fork input comprising the larger number of turns a variable load impedance is connected, and that through proper adjustment of the variable impedance the near subscriber's station as well as that of the remote subscriber are brought to equal degrees of gain at the output terminals of the fork.

According to a further feature of the invention the insertion-attenuation is made to be negligibly small, the turns ratio being adequately chosen.

The invention and its objects will be illustrated by the following description of a specific embodiment taken in connection with the accompanying drawing.

Referring to the drawing there is illustrated a monitoring device AE connected to the secondary coil S of transformer T. The primary P of a transformer T having a secondary winding S and a primary winding P constitutes an interconnecting network. The primary is tapped at an unequal point 4 along its length so that the portion P1 contains more turns of wire than does the portion P2. A monitoring device AE is coupled at points 3 to the secondary winding S. A remote subscriber's station is shown diagrammatically at FT and is serially connected to the entire primary P via a variable load impedance N. A local subscriber's station is shown diagrammatically at NT and is coupled between point 4 on the primary P and the junction of variable impedance N and the remote station FT. In practice the impedance N may be a known form of variable attenuating pad for controlling the net gain of the system and will also match the unequal impedances characteristic of each of the ends of the line.

The known fork connections serve to decouple completely one of four pairs of terminals from the others, this depending on the direction of energy flow therein. In a filter connection, the stop attenuation between the pairs of terminals 3, 4 depends on the accuracy which in respect of the frequency range transferred is peculiar to the impedance N. If the fork connection were balanced, the circuit energy would be divided in two equal parts and the fork attenuation (insertion-attenuation) between the pairs of terminals 1, 4 would amount to 0.7 nepers. Also there is known a fork connection that has a filter network preconnected to it. In its stop range this network acts to detune the output resistance of the fork and thereby to unbalance the fork so that a corresponding frequency will appear at the fork diagonal. Under the invention, however, the stop attenuation is uniformly variable through variation of the variable impedance N and in such a range that the attenuation between the monitoring device AE (terminals 3) on the one hand and the near subscriber's station NT (terminals 4) or the remote subscriber's station FT (terminals 1) on the other hand shall be adjustable to the same values. Owing to the fork having its sides unequal, the insertion or fork attenuation between NT and FT is of neglectably small values, being less than 50 micronepers, for example.

None of the aforesaid known fork connections deals with the problem underlying the invention, namely, that voltages transferred in a two-wire connection in both directions are to appear both at one pair of terminals and at the same magnitude.

It will be observed that currents emanating from the near subscriber divide and flow in opposite directions in the primary P; a portion flowing in the direction of the arrow A1 toward the distant station FT, and another portion flowing in the direction of the arrow A2. The reverse currents cause a partial cancellation of the magnetic flux generated in the primary P and consequently the transfer of energy to the secondary S and the monitoring device AE is limited. On the other hand, the currents emanating from the distant station FT traverse the entire primary P of the transformer in the direction of the arrow A3 and consequently full flux is developed in the primary P although the currents divide, some passing to the near subscriber NT and the others passing to the impedance N.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A coupling network for coupling a monitoring circuit to a two-way communication circuit comprising a local station and a distant station, a two-wire line having its opposite ends connected to said stations, respectively, said network coupled between said line and said stations at a point nearer the local station than the distant station, said network characterized in that it comprises a coupling transformer and a variable impedance, said transformer having a primary winding tapped to provide two unbalanced windings and a secondary winding, said secondary winding coupled to said monitoring circuit, said primary winding, said variable impedance and the line leading to said distant station being serially connected, the line leading to said local station being serially connected between said tapping and the junction of said variable impedance and the line leading to said distant station, whereby the energy applied to said monitoring circuit and derived from either of said stations is maintained substantially constant independent of the resistance of the portion of the line leading to the station supplying said energy.

2. A coupling network as claimed in claim 1, wherein the ratio of turns in said unbalanced windings is chosen to provide an insertion loss of less than 50 micronepers between said stations.

References Cited in the file of this patent

UNITED STATES PATENTS 2,511,085 Smith ---------------- June 13, 1950

2,524,350 Houdek ---------------- Oct. 3, 1950